United States Patent [19]
Holland

[11] 3,849,094
[45] Nov. 19, 1974

[54] OIL BATH AIR FILTER ELEMENT

[76] Inventor: Will W. Holland, 1702 First St., Brownwood, Tex. 76801

[22] Filed: Mar. 5, 1974

[21] Appl. No.: 448,228

[52] U.S. Cl.................. 55/330, 55/464, 55/502, 55/510
[51] Int. Cl............................................. B01d 50/00
[58] Field of Search ............. 55/244, 246, 250, 251, 55/320, 329, 510, DIG. 28, 248, 502, 330, 464

[56] References Cited
UNITED STATES PATENTS

| | | | |
|---|---|---|---|
| 283,025 | 8/1883 | Rowan | 55/244 X |
| 2,083,983 | 6/1937 | Brenner | 55/250 X |
| 2,239,181 | 4/1941 | Smith | 55/248 X |
| 2,906,370 | 9/1959 | McMullen et al. | 55/251 X |

FOREIGN PATENTS OR APPLICATIONS

| | | | |
|---|---|---|---|
| 869,710 | 3/1953 | Germany | 55/251 |
| 641,399 | 8/1950 | Great Britain | 55/250 |

Primary Examiner—Frank W. Lutter
Assistant Examiner—Kathleen J. Prunner
Attorney, Agent, or Firm—Wofford, Felsman, Fails & Zobal

[57] ABSTRACT

An oil bath air filter element for use in a motor vehicle comprising an annular container to be inserted in the air filter bowl or shell of a motor vehicle for filtering purposes and which may be removed for servicing. The annular container has an inlet formed in the upper end of its outer wall and an outlet formed in the upper end of its inner wall. Located within the annular chamber is an air direction changer for directing the air to make three 180° turns when flowing from the inlet to the outlet of the container. The annular container also is adapted to receive a quantity of oil or the like in its bottom and, in addition, an air pervious filter medium next to its inner wall in the flow path of the air from the direction changer to the air outlet. A removable top is provided for opening the container for servicing purposes when required.

8 Claims, 6 Drawing Figures

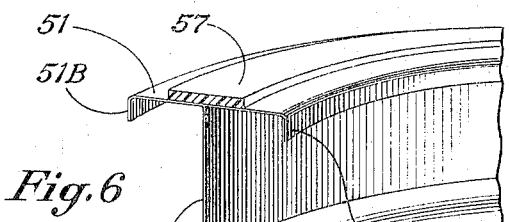
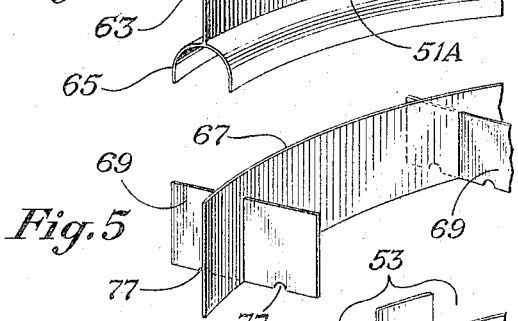
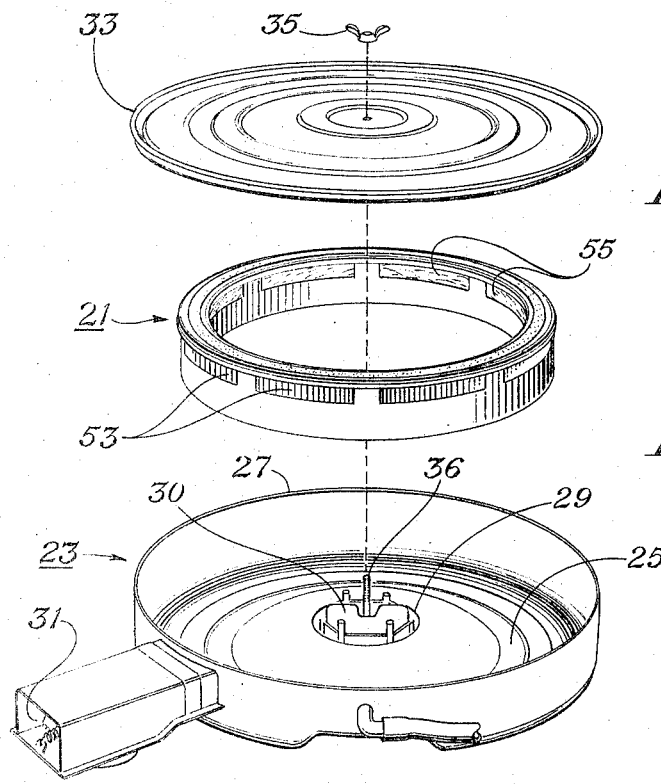
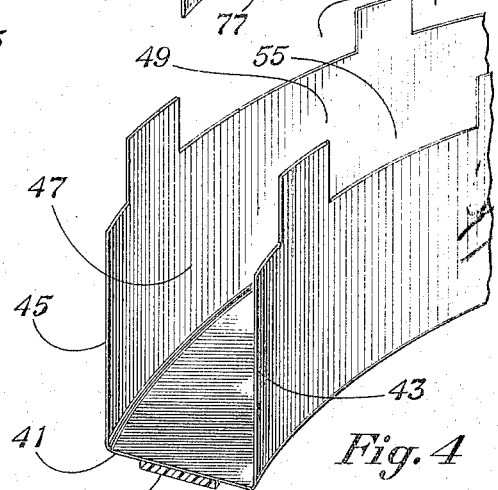
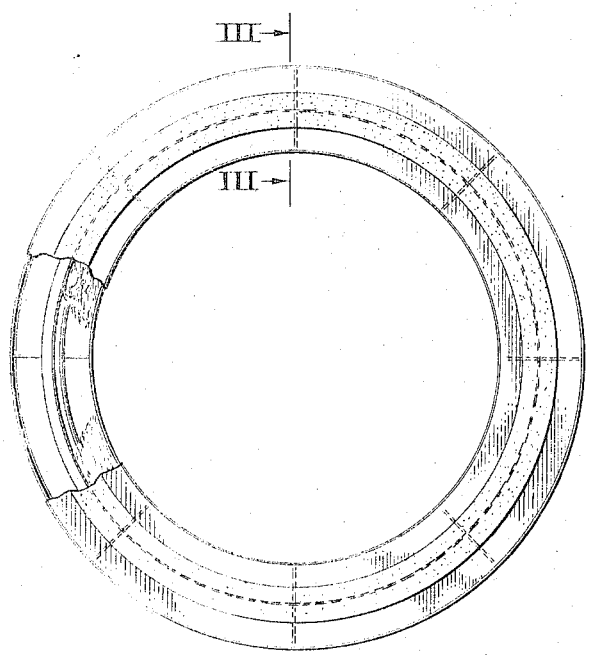
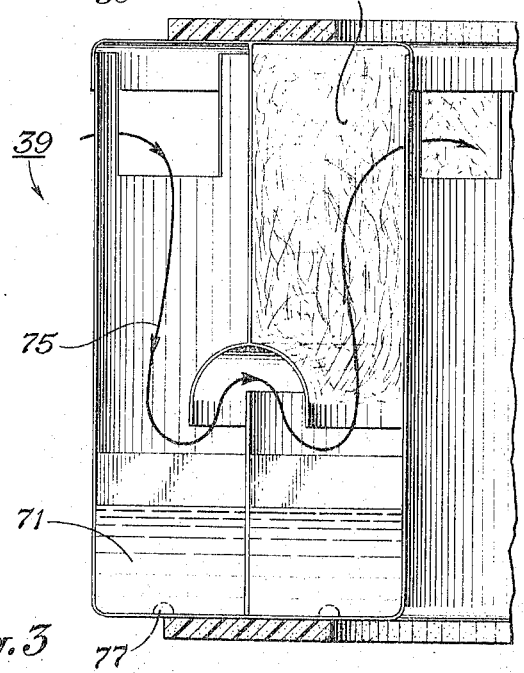

OIL BATH AIR FILTER ELEMENT

BACKGROUND OF THE INVENTION

This invention relates to an air filter for a motor vehicle and more particularly to a removable oil bath air filter element adapted to fit in the air filter bowl of a motor vehicle.

Although the conventional paper air filters now employed in automobiles have experienced widespread use, they have disadvantages in that their filtering action is not as effective or efficient as desired particularly in damp or moist weather thereby reducing the gas mileage of the automobile. Moreover, the conventional paper filter must be replaced periodically, which, over a long period of time, increases the upkeep cost of the automobile. The average auto driver does not think to service his filter until gas consumption is unreasonable. Moreover, the conventional filter bowl or shell is constructed such that the owner or operator until now has had no choice but to buy the paper filter.

SUMMARY OF THE PRESENT INVENTION

It is an object of the present invention to provide an oil bath air filter element which may be employed in the filter bowl or shell of a motor vehicle instead of the conventional paper filter and which provides more effective and efficient filtering action particularly in damp or moist conditions and hence increases the miles per gallon which the motor vehicle may achieve.

It is a further object of the present invention to provide an oil bath air filter element which may be cleaned and serviced thereby eliminating the cost of replacement and moreover, which may be employed effectively for a long period of time before servicing is required.

In the embodiment disclosed, the oil bath air filter element comprises an annular container formed by bottom wall structure and inner and outer walls extending therefrom forming an annulus with an upper annular opening. An annular top means is adapted to fit over and close the opening. The annular container is adapted to be inserted within the filter bowl between its central aperture formed in its bottom and its surrounding walls and to be in sealing contact with the bottom of the bowl and its top when inserted in place. The annular container has air inlet means formed through its outer wall near the upper end thereof and air outlet means formed through its inner wall near the upper end thereof to allow passage of air from the air intake of the bowl to its central aperture by way of the annular filter element. Located in the annulus of the container is an air direction changer for directing the air to make three 180° turns when flowing from its inlet means to its outlet means. In addition, the bottom of the annular container is adapted to receive a quantity of oil or the like and a portion of the annulus next to the inner wall is adapted to receive an air pervious filter medium in the flow path of the air between the direction changer and the air outlet means.

In the embodiment disclosed, an annular plate has one edge connected to the lower surface of the annular top means at a position spaced from its side edges. In addition, an annular member, U-shaped in cross section and inverted, has its top portion connected to the other edge of the plate such that when the annular top means is located in its closed position, the annular plate and annular U-shaped member extend down into the annulus with the inside surface of the annular U-shaped member facing the bottom of the annular container and with the sides and lower edges of the annular U-shaped member being spaced from the inner and outer walls and from the bottom wall structure of the annular container. In addition, there is provided annular means adapted to be located in the bottom of the annular container and to extend upward into the annular U-shaped member to a position spaced from its walls when the top means is located in its closed position and hence when said plate and annular U-shaped member extend down into said annulus. The plate and annular U-shaped member and the annular means form the air direction changer. The air pervious filter medium is located in the annulus between the annular plate and the inner wall of the container.

In the preferred embodiment, the annular means which is adapted to be located in the bottom of the annular container comprises an annular plate having a plurality of spaced baffle plates coupled thereto and extending from opposite sides thereof. In addition, seal means is coupled to the bottom and top of the annular container to form a seal between the bottom and the top of the bowl when the annular container is located in the bowl.

BRIEF DESCRIPTION OF THE DRAWINGS

FIG. 1 is a perspective view of the oil bath air filter element of the present invention illustrating the manner in which it may be inserted into or removed from the conventional air filter bowl or shell of an automobile;

FIG. 2 is a plan view of the air filter element with a portion of its top broken away;

FIG. 3 is an enlarged cross-sectional view of the air filter element taken through lines 3—3 of FIG. 2; and FIGS. 4–6 illustrate there component parts of the air filter element.

DETAILED DESCRIPTION OF THE INVENTION

Referring to FIG. 1, the oil bath air filter element of the present invention is identified at 21 and is adapted to be inserted into a conventional air filter bowl 23 of an automobile for filtering air fed into the carburetor. The filter bowl 23 comprises a bottom 25 having surrounding walls 27 and a central aperture 29 adapted to fit over the intake of the carburetor illustrated at 30. Extending through the wall 27 is an air intake 31. Also provided is a top 33 adapted to fit over the top of the wall 27 and which is held in place by a wing nut 35 adapted to be threaded onto the threaded rod 36 extending upward from the carburetor.

Referring to FIGS. 2–6, the oil bath air filter element of the present invention comprises an annular container 39 comprising bottom wall structure 41 with inner and outer wall structure 43 and 45 extending upward therefrom forming an annulus 47 with an upper annular opening 49. A removable annular top or cover 51 is adapted to fit over and close the opening. As illustrated, the top 51 has downwardly extending side flanges 51A and 51B which may be slipped around the top of the side walls 43 and 45 in a relatively tight slip fit thereby insuring an effective closure of the top opening. A plurality of spaced inlet openings 53 are formed in the top end portion of the outer wall 45 while a plurality of spaced outlet openings 55 are formed in the upper end portion of the inner wall 43. Sealing strips 57 and 59 are attached to the top of the cover 51 and to the bottom end of the bottom wall 41, respectively, of the container. When inserted in place in the bowl 23, the filter element will be located between the central aperture 29 and the surrounding wall 27. The bottom sealing strip 59 will engage the bottom 25 of the bowl while the top sealing strip 57 will engage the top of the bowl cover 33 when it is secured in place. The air flow path is through the intake 31 of the bowl, through the filter element by way of inlets 53 and outlets 55, and into the carburetor intake.

Effective air filtering is carried out by an air direction changer, a quantity of oil, and a porous filter medium, all of which are located within the annular container. The air direction changer comprises an annular plate 63 connected to the underside of the top or cover 51 and to the top of an annular U-shaped member 65 and a lower annular plate 67 which is adapted to fit in the bottom of the container and extend upward into the U-shaped member. As illustrated, the top edge of the plate 63 is connected to the underside of the top or cover 51 midway between its side edges. The plate 63 extends downward and has its lower edge connected to the top portion of the annular U-shaped member 65. Thus, when the top or cover 51 is located in place to close the upper annular opening, the plate 63 and U-shaped member 65 will extend downward into the annulus 47 of the annular container. The plate 67 is located at a position midway between the sides 45 and 43 and is supported in place by a plurality of spaced baffles 69 which extend from its opposite sides. The top of the plate 67 extend upward into the U of the U-shaped member whereby when air enters the container 23 through inlets 53 it will make three 180° turns. The total area of the inlets 53 is greater than the total area formed between the top of the lower plate 67 and the inside top surface of the U-shaped member 65 such that the rate of air flow is increased upon going through the direction changer.

The oil employed in the oil bath filter element is illustrated at 71 in the bottom of the container. Located between the plate 63 and the inner wall 43 and in the flow path of the air from the direction changer to the air outlet ports 55 is an air pervious filter medium 73 which preferably is a heat resistant oil absorbent hair-like filter medium which is conventional and which may be, for example, synthetic plastic fibers available on the market.

The air flow path through the oil bath filter element is illustrated by the arrows 75. As the air passes through the filter element, it makes three 180° turns for removing dust or foreign matter from the air which is forced or falls into the oil 71 and the last turn directs the air to flow through the fibrous filter medium for removing any further traces of dust, foreign matter, oil, etc. from the air. Thus, there is provided a filter which is very effective and efficient in filtering air and hence will increase the gas mileage obtained by an automobile. The subject air filter will last the lifetime of the vehicle and servicing, when required, may be easily carried out by removing the container from the filter bowl, removing the top cover 51 and its members 63 and 65 to allow the filter medium 73 to be removed, as well as the lower plate 67 and baffles 69 and the oil 71. The inside of the container as well as the plate 63, annular member 65, and plate 67 and its baffles 69 may be cleaned and re-inserted into the container. A fresh quantity of oil then may be poured into the container and clean fibrous material then may be inserted in place. Thus, serving is simplified and may be readily carried out and moreover, due to the effective filtering action of the filter element, the frequency of servicing is at a minimum. As indicated above, the present oil bath filter element is much more effective in moist or damp weather than the conventional paper filter and also is more effective with the new smog devices now required by automobiles. Moreover, the filter element of the present invention may be produced at a cost only slightly higher than the cost of a conventional paper filter. Thus, the present filter element results in less pollution, more power, better gas mileage, and longer engine life.

In one embodiment, the annular container 39 of the oil bath filter element may have a width from inner wall 43 to outer wall 45 of 1 inch and a height of 1 ¾ inches. The level of the oil 71 inserted in the container will be below the lower edges of the U-shaped member 65. The plate 67 will extend upward into the U-shaped member 65 to a position about one-half of its height. In one embodiment, the filter element may have an outside circumference of about 31 inches. This embodiment is suitable for use on a 250 cubic inch displacement motor employed on a 1973 model Chevrolet. It is to be understood, for use on different types of automobiles, the dimensions of the oil bath filter element will vary.

The oil employed in the oil bath filter element may be conventional motor oil used in automobile engines. In the filter element, the baffles 69 prevent the oil from surging from fast starts, stops, and cornering. Apertures 77 formed through the bottom edges of the baffles 69 permit the level of the oil to equalize in the container. If desired, similar apertures may be formed in the bottom edge of plate 67.

The annular container of the filter element, including its top, and the components forming the direction changer may be formed of metal or suitable heat resistance plastic.

I claim:

1. An annular air filter element adapted to be inserted into an air filter bowl of a motor vehicle and to be removed therefrom for servicing, said bowl having a bottom end with a central aperture adapted to fit over the air intake of a carburetor, surrounding side walls with an air intake, and a removable top, said annular filter element comprising:

an annular container formed by bottom wall structure and inner and outer walls extending therefrom forming an annulus with an upper annular opening, a removable annular top means adapted to fit over and close said opening, said annular container being adapted to be inserted within said filter bowl between said central aperture and said surrounding walls and to be in sealing contact with the bottom of said bowl and its top when inserted in place, said annular container having air inlet means formed through said outer wall near the upper end thereof and air outlet means formed through said inner wall near the upper end thereof to allow passage of air from the air intake of said bowl to said central aperture by way of said annular filter element, an air direction changer means located in the annulus of said container for directing the air to make three 180° turns when flowing from said inlet means to said outlet means, a quantity of oil or the like located in the bottom of said annular container, and an air pervious filter medium located in the flow path of the air between said air direction changer and said outlet means.

2. An annular air filter element adapted to be inserted into an air filter bowl of a motor vehicle and to be removed therefrom for servicing, said bowl having a bottom end with a central aperture adapted to fit over the air intake of a carburetor, surrounding side walls with an air intake, and a removable top, said annular filter element comprising:

an annular container formed by bottom wall structure and inner and outer walls extending therefrom forming an annulus with an upper annular opening, a removable annular top means adapted to fit over and close said opening, said annular container being adapted to be inserted within said filter bowl between said central aperture and said surrounding walls and to be in sealing contact with the bottom of said bowl and its top when inserted in place, said annular container having air inlet means formed through said outer wall near the upper end thereof and air outlet means formed through said inner wall near the upper end thereof to allow passage of air from the air intake of said bowl to said central aperture by way of said annular filter element, an annular plate having one edge connected to the lower surface of said annular top means at a position spaced from its side edges, an annular member, U-shaped in cross section and inverted, having its top portion connected to the other edge of said plate such that when said annular top means is located in its closed position, said annular plate and said annular U-shaped member extends down into said annulus with the inside surface of said annular U-shaped member facing the bottom of said annular container and with the sides and lower edges of said annular U-shaped member being spaced from the inner and outer walls and from bottom wall structure of said annular container, annular means adapted to be located in the bottom of said annular container and to extend upward into said annular U-shaped member to a position spaced from its walls when said top means is located in its closed position and hence when said plate and said annular U-shaped member extend down into said annulus, said plate and said annular U-shaped member and said annular means forming an air direction changer for changing the direction of air flowing from said inlet means to said outlet means, said air direction changer directing the air to make three 180° turns when flowing from said inlet means to said outlet means, the bottom of said annular container being adapted to receive a quantity of oil or the like and the portion of the annulus between said annular plate and said inner wall of said container being adapted to receive an air pervious filter medium.

3. The air filter element of claim 2 wherein said annular means which is adapted to be located in the bottom of said annular container comprises an annular plate having a plurality of spaced baffle plates coupled thereto and extending from opposite sides thereof.

4. The air filter element of claim 3 comprising:
seal means coupled to the bottom and to the top of said annular container adapted to form a seal between the bottom and top of said bowl when said annular container is located in said bowl.

5. the air filter element of claim 2 comprising the combination therewith of a fibrous filter medium located in the portion of said annulus between said annular plate and said inner wall of said container.

6. The air filter element of claim 5 wherein said annular means which is adapted to be located in the bottom of said annular container comprises an annular plate having a plurality of spaced baffle plates coupled thereto and extending from opposite sides thereof.

7. The air filter element of claim 6 comprising:
seal means coupled to the bottom and to the top of said annular container adapted to form a seal between the bottom and top of said bowl when said annular container is located in said bowl.

8. The air filter element of claim 7 comprising the combination therewith of a quantity of oil or the like located in the bottom of said container below the lower edges of said annular U-shaped member.

* * * * *